Aug. 14, 1934.  A. M. STANLEY  1,970,438
WELDED SPOKE WHEEL
Original Filed Nov. 2, 1927
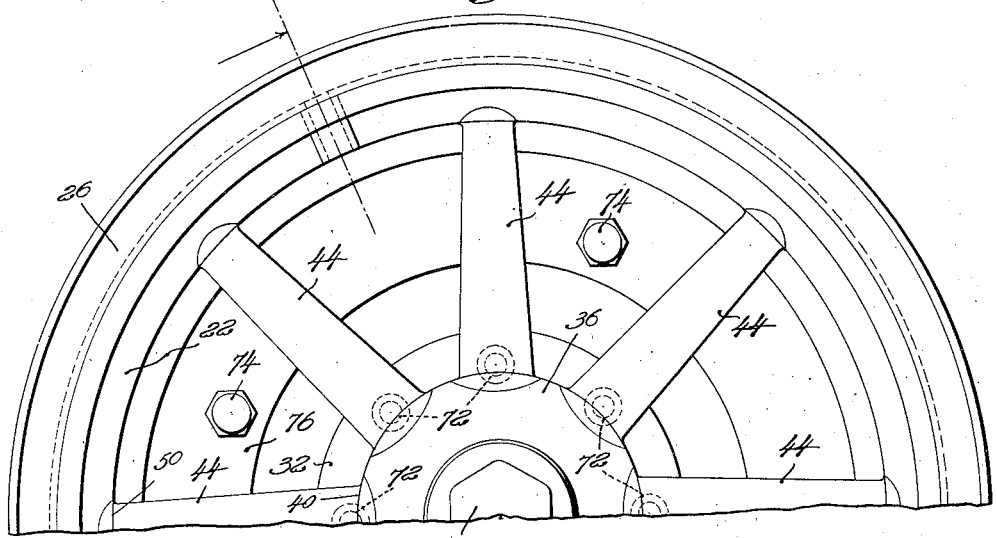
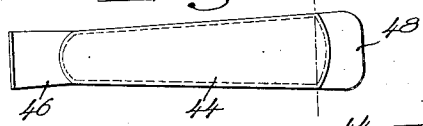
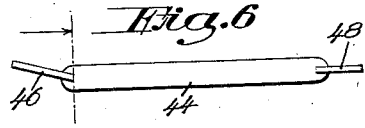
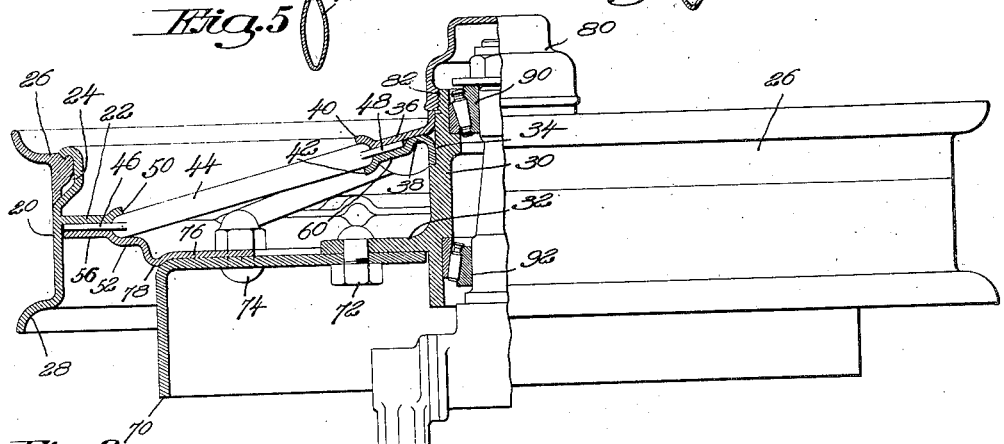
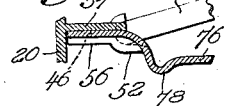
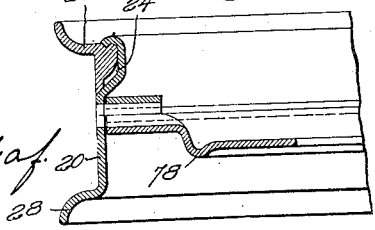

Patented Aug. 14, 1934

1,970,438

UNITED STATES PATENT OFFICE 1,970,438

WELDED SPOKE WHEEL

Arthur M. Stanley, Lynn, Mass., assignor to Stanley Engineering, Inc., Boston, Mass., a corporation of Massachusetts Application November 2, 1927, Serial No. 230,477
Renewed November 28, 1933

5 Claims. (Cl. 301—6)

The present invention relates to metallic wheels, and more especially to metallic wheels having particular utility for use in motor vehicles.

The object of the present invention is to provide a new and attractive form of metallic wheel having particular adaptability to present-day motor vehicle usage.

With this and other objects in view, the various features of the invention consist in certain novel features of construction, combinations and arrangements of parts hereinafter described and claimed, the advantages of which will be obvious to those skilled in the art from the following description.

In the accompanying drawings illustrating the preferred form of the invention,

Fig. 1 represents an elevation of one-half of a wheel embodying the features of the invention;

Fig. 2 is a view illustrating an end view of the wheel partially broken away and shown in section;

Fig. 3 is a detail illustrating the construction by virtue of which the spoke ends are attached to the rim;

Figs. 4 to 7, inclusive, are details illustrating the shape of the spokes and the formation of the ends for attachment to the hub and rim of the wheel; and Fig. 8 is a detail illustrating the connection between the spoke end and rim flanges.

The wheel shown in the illustrated embodiment of the invention comprises an annular rim 20 having an inwardly extending, continuous flange 22 for connection with spoke ends. The rim is provided at one side with a depressed trough 24 for the reception of a conventional form of locking ring 26. At the opposite side the rim is provided with a retaining flange 28 cooperating with the locking ring for the retention of the pneumatic tire. Located centrally of the rim is an integral hub member 30 having at its rear end an outwardly extending flange 32, and at its opposite end having a slightly depressed annular seat 34 for the reception of cooperating hub flanges 36 and 38. The separate hub flanges 36 and 38 are provided with cooperating recessed portions 40 and 42 which are intended to receive and hold inner flattened spoke ends. Each spoke 44, as indicated more particularly in Figs. 4 to 7, is generally oval in cross-section with opposite flattened end portions 46 and 48, the end portion 46 being slightly inclined with respect to the longitudinal axis of the spoke for engagement with the rim flange 22. The recesses 40 and 42 formed in the hub flanges cooperate to form pockets fitting the spoke ends 48, the gradual enlargement of the flattened portion as the end of the spoke is approached tending to lock the spokes in the pockets when the parts are assembled. The opposite flattened ends 46 of the spoke are received in pockets formed by recesses 50 in the rim flanges 22 and cooperating recesses 52 formed in a separate spoke flange 54 to secure the rim ends of the spokes in place in the same manner as with the hub ends. From an inspection of Fig. 4, it will be evident that the rim ends 46 taper outwardly to lock these ends of the spokes within the pockets as in the case of the hub ends. In the case of both the hub and rim ends of the spokes, the recesses to receive the flattened ends 46 and 48 are formed entirely at the back of the wheel. In other words, at the rim ends of the spokes the flange 54 is provided with a series of depressions 56, forming a continuation of the depressions 52 and completely receiving the flattened ends of the spokes. At the hub ends the inner flanges 38 are likewise provided with depressions 60 designed for the reception of the flattened ends 48. With this construction, as will be more clearly evident from an inspection of Fig. 1, the flanges 22 and 36 at the front or outside of the wheel are provided only with the slight projections 50 adapted to receive the tubular spoke portion merging into the flattened end.

As will be evident from an inspection of Fig. 2, the tubular spokes incline rearwardly from the outer end of the hub to approximately the median plane of the wheel. Co-operating with the spokes for the purpose of strengthening and imparting rigidity to the wheel is a metallic braking drum 70 which is bolted adjacent its inner periphery to the hub flange 32 by securing bolts 72. Adjacent its outer periphery the braking drum is secured through bolts 74 to an inward projection 76 of the rim flange 54, this inward projection having an annular boss or reinforcement 78 formed at the outer periphery of the brake drum and serving to reinforce the connection between the drum and the rim of the wheel. Not only does the inward projection reinforce and stiffen the wheel, but in addition this projection forms a petticoat which closes the inside of the wheel and presents an attractive and unique appearance.

In actual practice this type of wheel may be conveniently and economically constructed commercially by separately forming the individual spokes, the hub flanges 36 and 38, the rim 20, and the separate rim flange 54 with its accompanying petticoat 76. Thereafter, the hub and rim flanges may be welded to one another and to the assembled spokes to complete the assembly of this portion of the wheel. Having assembled and united the spokes to the hub and rim flanges by welding or equivalent methods, the completed assembly is then mounted upon the hub 30 and rigidly connected thereto through the brake drum 70. After assembly, the hub flanges are secured in place upon the annular seat 34 by a cap 80 threadedly connected to the hub at 82 and bearing at its inner end against the base of the hub flanges. The integral hub 30 may vary slightly in its construction, depending upon whether it is to be employed in a rear wheel or front wheel. In either case, however, the same assembly of hub and rim flanges, spokes and brake drum is employed. As indicated more particularly in Fig. 2, the hub construction or axle mounting is shown as adapted for a front wheel, the mounting being provided with inner and outer bearings 90 and 92 which rotatively support a non-rotating axle or shaft. In employing the invention for a rear wheel the construction is essentially the same with a slightly different form of axle mounting being substituted for that shown, this axle mounting being adapted to receive a standard wheel assembly without modification.

It will be evident to those skilled in the art that in forming the wheel assembly, that is the hub flanges or spokes and the rim portions, before application to the axle mounting or central hub, the various members may be permanently united, either by welded areas passing through the co-operating flanges and spoke ends or by areas formed in the flanges between the spoke ends, the spoke ends being locked therein, due to the configuration and the squeezing between the flanges.

What is claimed is:

1. A vehicle wheel comprising an axle mounting, co-operating hub flanges slidingly supported at the front end of the mounting, an annular rim section having an inwardly extending flange, spoke members extending from the hub flanges to the rim section, a flange cooperating with the rim section to clamp the spoke ends thereto, means for rigidly uniting the hub flanges and rim flanges with the spoke ends clamped therebetween, a brake drum connected to the axle mounting, and connections between the brake drum and cooperating rim flange for locking the two against relative rotation.

2. A vehicle wheel comprising an axle mounting having an annular flange at its inner end and an annular receiving seat at its outer end, a wheel assembly including a rim, a portion provided with a flange adapted to be received on the seat of the axle mounting, spokes connecting the rim and the flanged portion, and a flange secured to the rim and extending inwardly toward the inner end of the axle mounting, a brake drum secured to the axle mounting flange, and means for securing the rim flange to the brake drum whereby the wheel assembly may be slidingly received and positioned on the axle mounting and rigidly secured against rotation with respect thereto.

3. A vehicle wheel comprising an axle mounting provided with an annular seat at its outer end, a brake drum secured to the inner end of the mounting, an assembly including a rim, inner spoke end connecting means adapted to be positioned by the annular seat, spokes connecting the rim and united at their inner ends by the means aforesaid and a flange permanently united with the rim and extending inwardly therefrom toward the brake drum, the flange having a circumferential shoulder which engages with the drum, and a series of bolts for detachably locking the flange to the drum when the latter is assembled therewith by sliding the assembly axially of the mounting.

4. A vehicle wheel comprising an axle mounting provided with an annular seat and a radially disposed flange, a brake drum secured to the flange, a rim, inner spoke end conecting means having spaced pockets adapted to be positioned by the annular seat on the axle mounting, rigid compression spoke members permanently secured in angular relation, each at one end within one of the pockets of the connecting means and at the other end to the rim to support the rim upon the axle mounting, a flange projection from the rim and detachable bolts accessible through the spaces between the spoke members for releasably clamping the flange projection to the brake drum.

5. A vehicle wheel comprising an axle mounting provided with a radial flange at one end, a brake drum secured to the radial flange, a rim, a series of rigid spoke members secured between the outer end of the axle mounting and the rim and a dished flange extending inwardly from the rim disposed with the bulge projecting inwardly away from the spoke members to increase the free space between the spoke members and the dished flange in an axial direction, and detachable bolts accessible through the spaces between the spoke members and the dished flange for releasably clamping said flange to the brake drum.

ARTHUR M. STANLEY.